United States Patent [19]
Huiberts et al.

[11] Patent Number: 5,270,534
[45] Date of Patent: Dec. 14, 1993

[54] SOLID-STATE IMAGE RECORDING APPARATUS HAVING TWO PAIRS OF ADJUSTMENT MEMBERS

[75] Inventors: Johannes T. E. Huiberts; Rudolph M. Snoeren; Coenraad A. A. M. Vugts, all of Eindhoven, Netherlands

[73] Assignee: U.S. Philips Corporation, New York, N.Y.

[21] Appl. No.: 975,175

[22] Filed: Nov. 12, 1992

[30] Foreign Application Priority Data

Sep. 14, 1992 [EP] European Pat. Off. ........ 92202800.6

[51] Int. Cl.$^5$ ............................................. H01J 3/14
[52] U.S. Cl. .................................. 250/216; 250/208.1
[58] Field of Search .................. 250/216, 208.1, 226, 250/207.4, 370.8, 370.9; 358/229, 481, 494, 75; 359/206, 215

[56] References Cited

U.S. PATENT DOCUMENTS

| | | | |
|---|---|---|---|
| 4,734,778 | 3/1988 | Kobayashi | 358/229 |
| 4,803,557 | 2/1989 | Bridges | 358/229 |
| 4,918,521 | 4/1990 | Yabe et al. | 358/229 |
| 5,157,251 | 10/1992 | Albrecht et al. | 250/216 |

Primary Examiner—David C. Nelms
Assistant Examiner—Que T. Le
Attorney, Agent, or Firm—Jack D. Slobod

[57] ABSTRACT

A solid-state imaging apparatus comprising a solid-state image sensor which is rotatable around an axis is provided. Adjusting the optical axis at right angles to the solid-state image sensor, aligning the optical axis with the rotational axis and centring the optical axis at the centre of the solid-state image sensor are performed employing adjustment members having a convex spherical contact face and a concave spherical support face. Employing such adjustment means is particularly advantageous when used in conjunction with a solid-state image sensor because such adjustment members are particularly effective in making a light-tight construction and in discharging heat from the solid-state image sensor.

5 Claims, 3 Drawing Sheets

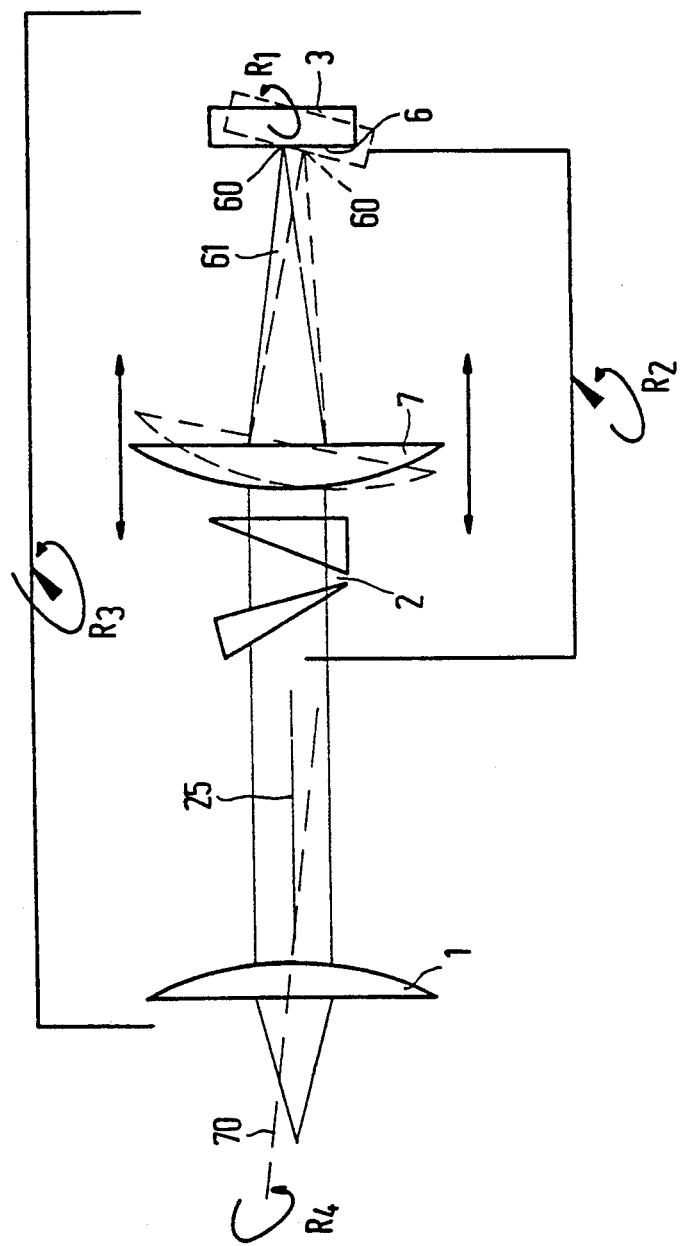

SOLID-STATE IMAGE RECORDING APPARATUS HAVING TWO PAIRS OF ADJUSTMENT MEMBERS

BACKGROUND OF THE INVENTION

1. Field of the Invention

The invention pertains to a solid-state image recording apparatus comprising a solid-state image sensor having an image recording face, an optical system having an optical axis, and a pair of adjustment members for aligning the image recording face, said pair including a first adjustment member having a convex spherical contact face and a second adjustment member having a concave spherical support face. The invention also relates to an x-ray imaging system comprising such a solid-state image recording system.

2. Description of the Related Art

A solid-state image recording apparatus of said kind has been described in the U.S. Pat. No. 4,734,778.

In the cited reference is described that said first adjustment member has the form of an adjusting member carrying a disk-shaped base onto which a solid-state image sensor is mounted. Furthermore, said second adjustment member has the form of a focusing ring that supports said first adjustment member. By way of rotating the first adjustment member about the centre of curvature of its convex spherical contact face, the solid-state image sensor is tilted so as to position an image recording face of the solid-state image sensor at right angles to an optical axis. The centre of the solid-state image sensor is aligned with the optical axis by translating the solid-state image sensor with the disk-shaped base with respect to the adjustment member. When optics with a low depth of field is employed, there is required a very-high-precision mounting for translation of the solid-state image sensor.

SUMMARY OF THE INVENTION

It is inter alia an object of the invention to provide a solid-state image recording apparatus comprising means for quickly and accurately positioning a solid-state image sensor.

This is achieved in that a solid-state imaging apparatus in accordance with the invention comprises at least one further pair of adjustment members, including an adjustment member having a convex spherical contact face and another adjustment member having a concave spherical support face.

The use of the known first pair of adjustment members having spherical contact and support faces, respectively, provides for accurate adjustment means for adjusting a recording face of a solid-state image sensor with respect to an optical axis. In view of the depth of focus employed in a solid-state image recording apparatus in accordance with the invention, the use of the known first pair of adjustment members achieves accurate adjustability of the image recording face of the solid-state image sensor at right angles to the optical axis. Moreover, because the contact area is comparatively large in adjustment means having spherical contact and support faces, discharging of heat from the solid-state image sensor is greatly enhanced, e.g. as compared to adjustment means employing a ball bearing.

However, apart from focusing the image recording face of the solid-state image sensor and aligning the image recording face at right angles to an optical axis, various other adjustments are called for. To that end, according to the invention, further pairs of adjustment members having spherical contact and support faces, respectively, are provided; all of said pairs of adjustment members adding to enhancement of heat discharge from the solid-state image sensor. Moreover, the use of pairs of adjustment members comprising adjustment members having spherical contact and support faces has a further advantage in that solid-state image recording apparatus in accordance with the invention is light-tight. In particular a solid-state image sensor is sensitive to stray light; therefore an apparatus comprising a solid-state image sensor is required to shield the solid-state image sensor from stray light so as to avoid a recorded image to be contaminated by stray light from any sources not pertaining to a scene to be imaged.

A preferred embodiment of a solid-state image recording apparatus in accordance with the invention is characterised in that a second pair of adjustment members is provided for centring an optical axis on a centre of the image recording face of the solid-state image sensor.

An output screen of an image intensifier, used as an x-ray image detector, and the image recording face have different aspect ratios. In order to achieve that an image produced on the output screen is imaged efficiently on the image recording face of the solid-state image sensor, anamorphotic optics are employed in a a solid-state image recording apparatus for use in an x-ray examination. Because the anamorphotic optics slightly tilts the optical axis, adjustability in that the optical axis is substantially perpendicular to the image recording face of the solid-state image sensor is called for and also adjustability in that the centre of the image recording face coincides with the optical axis is required.

A preferred embodiment of a solid-state image recording apparatus in accordance with the invention wherein the solid-state image sensor is rotatable around an axis of rotation, is characterised that a second pair of adjustment members is provided for aligning the optical axis with said axis of rotation.

In a solid-state image recording apparatus in an x-ray examination apparatus, the solid-state image sensor preferably is rotatable around an optical axis, so that the orientation is maintained of an image recorded by the solid-state image sensor when an object, e.g. a patient, is irradiated from different direction. Therefore, adjustability in that the optical axis is aligned with the axis of rotation is called for. Employing a still further pair of adjustment members having a spherical contact and a spherical support face, respectively, provides or accurate adjustability for aligning the optical axis with the axis of rotation and adds to improving heat discharge from the solid-state image sensor.

A further preferred embodiment of a solid-state image recording apparatus in accordance with the invention wherein the solid-state image sensor is rotatable around an axis of rotation, is characterised that a second pair of adjustment members is provided for centring an optical axis on a centre of the image recording face of the solid-state image sensor and a third pair of adjustment members is provided for aligning an optical axis with said axis of rotation.

To provide adjustability on that both the optical axis can be aligned with the axis of rotation pertaining to orienting the image recorded on the image recording face and that the optical axis can be centred on the image recording face is preferably carried out by means of a second and a third pair of adjustment members, respectively, comprising adjustment members having spherical contact and support faces. Thus accurate extensive adjustability is provided in combination with a light-tight construction so as to shield the solid-state image sensor from stray light.

An x-ray examination apparatus wherein an x-ray image is converted in a visible image and wherein said visible image is recorded by a solid-state image sensor, e.g. having the form of a charged-coupled device, preferably comprises a solid-state image recording apparatus in accordance with the invention.

These and other aspects of the invention will become apparent from and elucidated with reference to the embodiments described hereinafter and with reference to the accompanying drawing.

BRIEF DESCRIPTION OF THE DRAWING

FIG. 3 shows an schematic representation of optical systems incorporated in a solid-state image recording apparatus in accordance with the invention for illustration of performing adjustments.

DETAILED DESCRIPTION OF THE PREFERRED EMBODIMENTS

Figure 1:
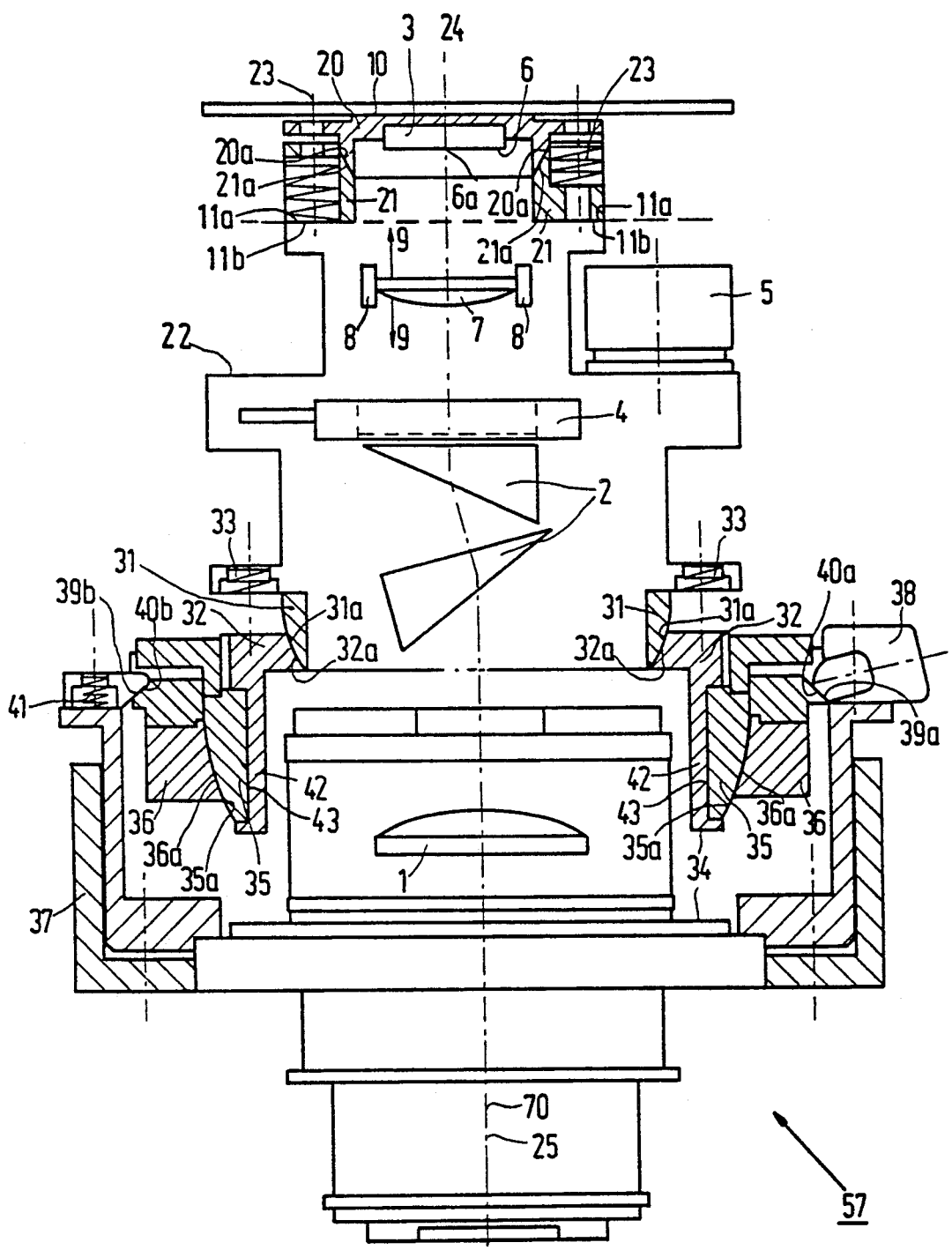
FIG. 1 shows a longitudinal sectional view of a solid-state image recording apparatus in accordance with the invention.

FIG. 1 shows a longitudinal sectional view of a solid-state image recording apparatus in accordance with the invention. Image carrying visible radiation enters the solid-state image recording apparatus 57 through an objective lens system 1. By means of anamorphotic optics 2 an aspect ratio of an input image is adapted to an aspect ratio of a solid-state image sensor 3, notably a semiconducting charge-coupled device. The amount of light incident of the charge-coupled device 3 is controlled by a diaphragm 4, which itself is controlled by a system 5 comprising a potentiometer and a motor. Positioning of the image recording face 6 of the charge-coupled device so that the focus of the optical system formed by the lens system 1, together with the anamorphotic optics 2 is positioned in the image recording face is achieved by providing camera optics 7 with a screw thread and mounting the camera optics within a ring 8 of which the inner circumference is threaded correspondingly to the screw thread of the camera optics. Focusing is then performed by moving the camera optics along the direction of the arrows 9 with respect to the charge-coupled device 3. For reading out the signal produced by the charge-coupled device a printed-circuit board 10 comprising required electronic components is mounted on a first adjustment member 20 together with the charge-coupled device 3.

For various adjustments a plurality of pairs of adjustment members is provided. The first adjustment member 20 comprises a convex spherical contact face 20a. Correspondingly the second adjustment member 21 comprising a concave spherical support face 21a is provided on a body tube 22. Said first and second adjustment members are easily and accurately positioned with respect to one another by means of an arrangement of screws and springs 23 so as to tilt the image recording face of the charge-coupled device to be at right angles with the optical axis 24. Said first and second adjustment members form the first pair of adjustment members that serves as a bearing for adjusting the image recording face of the solid-state image sensor substantially perpendicularly to the optical axis. In particular, said first pair of adjustment members adds to improving heat discharge from the solid-state image sensor.

The charge-coupled device 3, with the printed circuit board 10 and the first pair of adjustment members 20 with 21 are removably mounted on the body tube 22. the focus plane of the optical system consisting of the lens system 1, anamorphotic optics 2 and camera optics 7 is defined with respect to an interface support plane 11a. Furthermore, the image recording face 6 can also be positioned by means of the first pair of adjustment members and the system of screws and springs 23 with respect to an interface contact plane 11b. The interface contact plane 11a and the interface support plane 11b are formed so as to enable the charge-coupled device 3, with the printed circuit board 10 and the first pair of adjustment members 20 with 21 to be mounted fittingly on the body tube 22. Therefore, the image recording face can be adjusted with respect to said interface contact plane, and consequently so as to become at right angles with the optical axis of the camera optics 7 when mounted, when the charge-coupled device with the printed circuit board and the first pair of adjustment members are dismounted from the body tube. After mounting on the body tube no further adjustment of the image recording face to be parallel to the focus plane of the camera optics 7 is required.

The body tube 22 incorporates a third adjustment member 31 having a convex spherical contact face 31a. A fourth adjustment member 32 comprises a concave spherical support face 32a. A further set of screws and springs 33 is provided for controlling the positioning of said third and fourth adjustment members forming a second pair of adjustment members. The fourth adjustment member is mounted to a housing 34 which contains the optical system comprising lens system 1. By means of said second pair of adjustment members another bearing is formed, whereby the body tube can be tilted with respect to a housing 34 so that the optical axis 24 can be angulated in order to align the optical axis 24 with the centre 6a of the image recording face of charge-coupled device.

The housing 34 comprises also a fifth adjustment member 35 having a convex spherical contact face 35a. A sixth adjustment member 36 comprises a concave spherical support face 36a and is incorporated in an outer tube 37 which serves as a support frame carrying the housing 34. The body tube together with the solid-state image sensor 3 is mounted rotatably on the housing 34 by means of a ring-shaped bearing 42. The rotation by means of the bearing 42 has an axis of rotation 70 that preferably coincides with the optical axis of the lens system 1. This rotation serves for orientation of the image on the image recording face 6a. The separation of the body tube from the housing is constituted by an interface plane 43. The fifth and sixth adjustment members together form a third pair of adjustment members serving as a bearing for rotating the combination of the housing 34, the body tube 22 together with the charge-coupled device 3. The third pair of adjustment members also serves as a bearing for tilting said combination so as to align the optical axis 25 of the lens system 1 with the rotation axis around which said combination is rotated. The alignment of the optical axis 25 with said rotation axis is maintained by means of locking-means 38 comprising a spring and catch and a slanted edge 39a. The outer tube comprises a slanted edge 40b and the housing 34 comprises corresponding slanted edges 40a and 40b. For keeping said combination in its required position the slanted edges 40a is pressed against slanted edge 39a and slanted edge 39b is pressed against slanted edge 40b, respectively. Tilting of said combination is controlled by a yet further set of screw and springs 41

Figure 2:
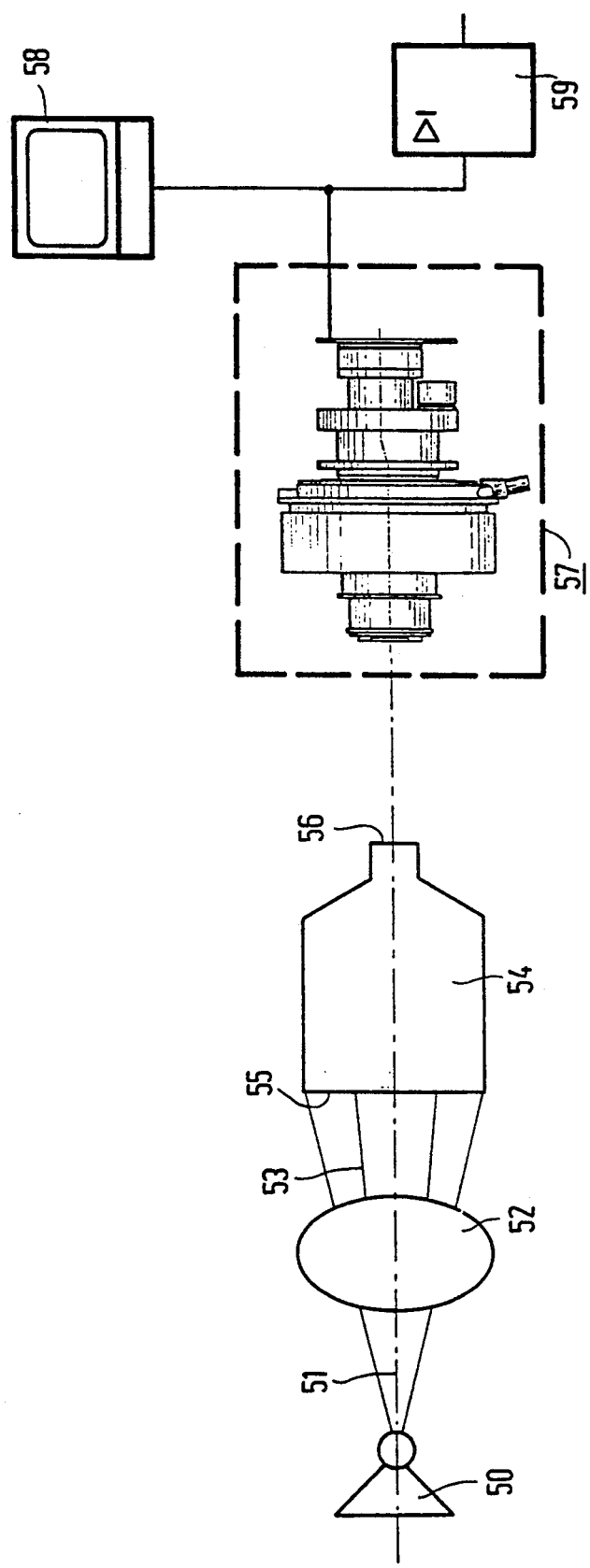
FIG. 2 shows a schematic representation of an x-ray imaging system comprising a solid-state image recording apparatus in accordance with the invention.

FIG. 2 shows a schematic representation of an x-ray imaging system comprising a solid-state image recording apparatus in accordance with the invention. An x-ray source 50 is provided for generating a beam of x-rays 51 which is directed to an object 52, e.g. a patient. The x-rays are attenuated by the object and the attenuated x-radiation 53 is collected by an x-ray image intensifier 54 having an input screen 55 and an output screen 56. An x-ray image collected on said input screen is converted into a visible image on the output screen. The solid-state image recording apparatus 57 in accordance with the invention is aligned with the x-ray image intensifier so that image carrying visible radiation emitted by the output screen 56 is collected by the lens 1 of solid-state image recording apparatus. The visible image is converted into an electronical signal by way of the charge-coupled device 4. The electronical signal is at option supplied to a monitor 58 for view the image recorded by the charge-coupled device or the electronical signal is supplied to an output buffer circuit-means 59 prior to further processing of the image.

In x-ray examination procedures, especially in cardiological examinations, the x-ray source and the x-ray image intensifier are rotated around the patient. It is inter alia an advantage of a solid-state image recording device in accordance with the invention that an orientation, e.g. displayed on a monitor 58, does not rotate as a consequence of varying the direction under which the patient is irradiated. It is achieved to maintain the orientation of the image displayed on the monitor by rotating the combination of the housing 34, the body tube 22 together with the charge-coupled device 4, so as to compensate for the rotation of the orientation of the image displayed, induced by varying the direction of irradiation.

FIG. 3 shows an schematic representation of optical systems incorporated in a solid-state image recording apparatus in accordance with the invention for illustration of performing adjustments. A rotation $R_1$ of the solid-state image sensor 3 can be performed, by means of the first pair of adjustment members described hereinbefore, so as to align the image recording face 6 to be parallel with the focus plane of the camera optics 7. And by moving the camera optics in the direction of the arrows 9 the focus plane of the camera optics can be made coincident with the image recording face of the solid-state image sensor. The solid-state image sensor 3 together with the camera optics 7 and the anamorphotic optics 2 can be tilted by performing, by means of the second pair of adjustment members described hereinbefore, a rotation $R_2$ so as to change the angle of incidence of the parallel beam emanating form the lens system 1. As a consequence of rotation $R_2$ the position of the image on the image recording face is varied. Because due to rotation $R_2$ only the focus 60 of the converging beam 61 is moved in the in the focus plane of the camera optics 7, the recorded image remains sharp over its entire area, because the focus plane remains coincident with the image recording face 6 as is adjusted by rotation $R_1$. The combination of solid-state image sensor, camera optics and lens system 1 are rotatable around an axis of rotation 70, by means of the bearing 42, thus providing for a rotation $R_4$. In FIG. 3 the axis of rotation 70 pertaining to rotation $R_4$ is drawn to be at an angle with the optical axis 25 of the lens system 1. Such an angle of the axis of rotation 70 with the optical axis 25 is undesired because when performing rotation $R_4$ while the optical axis 25 is not coincident with the axis of rotation 70 gives rise the rotation of the image recorded on the image recording face 6. The combination of lens system 1, camera optics 7 and solid-state image sensor 3 can be tilted together, by means of the third pair of adjustment members described hereinbefore, according to a rotation $R_3$ so as to align the optical axis 25 with the axis of rotation 70.

We claim:

1. A solid-state image recording apparatus comprising a solid-state image sensor having an image recording face, an optical system having an optical axis, and a pair of adjustment members for aligning the image recording face, said pair including a first adjustment member having a convex spherical contact face and a second adjustment member having a concave spherical support face, characterised in that the solid-state image recording apparatus comprises at least one further pair of adjustment members, including an adjustment member having a convex spherical contact face and another adjustment member having a concave spherical support face.

2. A solid-state imaging apparatus as claimed in claim 1, further characterised in that a second pair of adjustment members is provided for centering an optical axis on a center of the image recording face of the solid-state image sensor.

3. A solid state imaging apparatus as claimed in claim 1, wherein the solid-state image sensor is rotatable around an axis of rotation, further characterised that a second pair of adjustment members is provided for aligning the optical axis with said axis of rotation.

4. A solid state imaging apparatus as claimed in claim 1, wherein the solid-state image sensor is rotatable around an axis of rotation, further characterised that a second pair of adjustment members is provided for centering an optical axis on a center of the image recording face of the solid-state image sensor and a third pair of adjustment members is provided for aligning an optical axis with said axis of rotation.

5. An x-ray examination apparatus comprising an X-ray image intensifier having an input screen for receiving an X-ray image and an output screen for forming thereon an output image responsive to the X-ray image, and a solid state image sensor image recording apparatus comprising a solid-state image sensor having an image recording face, an optical system for imaging said output image onto said image recording face, said optical system having an optical axis, and a pair of adjustment members for aligning the image recording face, said pair including a first adjustment member having a convex spherical contact face and a second adjustment member having a concave spherical support face, characterized in that the solid-state image recording apparatus comprises at least one further pair of adjustment members, including an adjustment member having a convex spherical contact face and another adjustment member having a concave spherical support face.

* * * * *